(12) United States Patent
Rodriguez et al.

(10) Patent No.: US 6,245,877 B1
(45) Date of Patent: Jun. 12, 2001

(54) URETHANE COMPOSITIONS

(75) Inventors: Carmen L. Rodriguez, King of Prussia; Stephen L. Goldstein, Glen Mills, both of PA (US)

(73) Assignee: ARCO Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/558,913

(22) Filed: Apr. 26, 2000

(51) Int. Cl.$^7$ .................................................... C08G 18/48
(52) U.S. Cl. ................................ 528/79; 528/59; 525/504
(58) Field of Search ........................ 528/59, 79; 525/504

(56) References Cited

U.S. PATENT DOCUMENTS

| 4,167,538 | 9/1979 | Taniguchi et al. | 525/438 |
| 4,241,201 | 12/1980 | Annis | 525/503 |
| 4,539,345 | 9/1985 | Hansen | 523/219 |
| 5,679,871 | 10/1997 | Nava | 568/648 |
| 5,889,137 | 3/1999 | Hutchings et al. | 528/205 |

FOREIGN PATENT DOCUMENTS

WO 97/19972  6/1997  (WO).

*Primary Examiner*—Rachel Gorr
(74) *Attorney, Agent, or Firm*—Shao Guo

(57) ABSTRACT

A moisture-cure urethane composition is disclosed. The urethane is formulated from an NCO-terminated alkoxylated phenolic resin that has long oxyalkylene chains. It has greater than 70 wt % solids and has excellent resistance to acids, bases, and chemicals.

10 Claims, No Drawings

URETHANE COMPOSITIONS

FIELD OF THE INVENTION

The invention relates to moisture-cure urethane compositions that have ultra-high solids contents. In particular, the invention relates to moisture-cure urethane compositions derived from liquid alkoxylated phenolic resins.

BACKGROUND OF THE INVENTION

Urethane coatings are defined as coatings that contain urethane (—NHCOO—) or urea (—NHCONH—) groups. They are reaction products of isocyanates and hydroxyl functional resins. Depending on the hydroxyl components, urethane coatings can be divided into acrylic-urethanes, polyester-urethanes, polyether-urethanes, and many others. Properties and applications of urethane coatings depend largely on the hydroxyl components. For example, polyether-urethane coatings have excellent flexibility but poor weathering stability and chemical resistance, while acrylic-urethane coatings have excellent weathering stability and chemical resistance but low flexibility.

Urethane coating formulations can also be categorized into two-component (two-pack) and one-component (one-pack) systems. Two-component urethanes consist of a hydroxyl component and an isocyanate (NCO) component. These two components are packed separately and mixed in a desired ratio prior to application. One-component urethanes include urethane lacquers (solutions of thermoplastic urethanes), uralkyds, blocked urethanes, and moisture-cure urethanes. An advantage of one-component urethanes is their convenience of application. Moisture-cure urethane formulations contain in a single package an NCO-terminated resin, a solvent, and, optionally, a catalyst. When the coating is applied on a surface, the solvent evaporates, and the NCO groups react with moisture in the air and form urea linkages to crosslink the resin. Since they are cured by moisture in the air, their utility is limited to thin films. Another disadvantage of prior art moisture-cure urethane coatings is that the NCO-terminated resins have higher molecular weights, therefore higher viscosities than those of two-component urethane coating formulations. This limits the growth of moisture-cure urethane coatings because of the higher solvent demand and the resulting higher VOC (volatile organic compound) contents. Moisture-cure urethane coatings are usually polyether-urethanes. Because of the poor weathering stability and chemical resistance of polyether polyol systems, these moisture-cure urethane coatings are used primarily as primers and base-coats for surfaces of metal, wood, and concrete structures such as water tanks, pipes, bridges, and decks.

Phenolic resins, though widely used in other coatings, have found limited use in urethanes because phenolic hydroxyl groups are not sufficiently reactive with isocyanates. Modifying urethane coatings with phenolic resins has been attempted because they can potentially improve chemical resistance of urethanes, particularly moisture-cure urethanes. For example, U.S. Pat. No. 4,539,345 discloses moisture-cure urethanes based on blends of an NCO-terminated polymer, a terpene-phenolic resin, and a silane compound.

Alkoxylating phenolic resins changes phenolic hydroxyls into aliphatic hydroxyls and makes it possible to use phenolic resins in urethanes. For example, U.S. Pat. No. 4,167,538 teaches the preparation of a resinous (i.e., solid) alkoxylated phenolic resin. The resin has a softening point (for polymers, the softening point is usually about 50° C. below the melting point) within the range of 30° to 150° C., preferably from 40° to 80° C. However, the alkoxylated phenolic resin is not suitable for use in moisture-cure urethane coatings because it is too rigid and has a high solution viscosity.

Other alkoxylation techniques are known. For example, U.S. Pat. No. 5,679,871 teaches alkoxylating phenolic resins with alkylene carbonates rather than alkylene oxides. The advantage of using cyclic carbonates such as ethylene glycol carbonate or propylene glycol carbonate is that the alkoxylated phenolic resins do not contain long oxyalkylene chains; unlike alkylene oxides, alkylene carbonates do not polymerize during the alkoxylation. Alkoxylated phenolic resins with short oxyalkylene chains have high glass-transition temperatures or softening points.

Formulating urethane coatings from alkoxylated phenolic resins is also known. For example, WO 97/19972 teaches how to prepare a two-component urethane coating from a propoxylated phenolic resin. However, the coating has a low solids and high VOC contents.

It is unknown to formulate moisture-cure urethanes from alkoxylated phenolic resins, especially from liquid alkoxylated phenolic resins that have long oxyalkylene chains. We have surprisingly found that moisture-cure urethane coatings prepared from liquid alkoxylated phenolic resins have extremely low solvent demand and, therefore, very low VOC contents. In addition, the coatings have excellent chemical resistance compared to the conventional moisture-cure urethane coatings.

SUMMARY OF THE INVENTION

The invention is a moisture-cure urethane composition. The urethane composition comprises an isocyanate-terminated polymer. The polymer is the reaction product of from about 25 to about 95 wt % of a liquid alkoxylated phenolic resin and from about 5 to about 75 wt % of a multi-functional isocyanate. The liquid alkoxylated phenolic resin has an average oxyalkylene chain length from about 3 to about 25. The urethane composition has a solids content greater than about 70 wt %.

DETAILED DESCRIPTION OF THE INVENTION

Moisture-cure urethanes of the invention comprise an isocyanate (NCO) terminated polymer that contains from about 25 to about 95 wt % of a liquid alkoxylated phenolic resin. By "liquid," we mean that the alkoxylated phenolic resin is pourable at room temperature (25° C.). It preferably has a viscosity at 25° C. less than 20,000 cps, more preferably less than 10,000 cps.

The alkoxylated phenolic resin used in making the NCO-terminated polymer has an average oxyalkylene chain length from about 3 to about 25, preferably about 5 to about 15 oxyalkylene units. The longer the oxyalkylene chain, the more flexible the alkoxylated phenolic resins. However, long oxyalkylene chains (i.e., more than about 25 oxyalkylene units) may result in final coating products with poorer weathering stability and less chemical resistance.

The alkoxylated phenolic resin preferably has an average hydroxyl functionality from about 2 to about 10, and more preferably from about 2 to about 5. Alkoxylated phenolic resins with high hydroxyl functionality can cause gel formation in the preparation of the NCO-terminated polymers.

The alkoxylated phenolic resins preferably have a number average molecular weight (Mn) from about 500 to about 10,000, more preferably from about 500 to about 5,000, and most preferably from about 1,000 to about 4,000.

Alkoxylated phenolic resins used in the invention include propoxylated, ethoxylated, and butoxylated phenolic resins, and the like, and mixtures thereof. They also include alkoxylated phenolic resins that have mixtures of oxyalkylene units.

Alkoxylated phenolic resins can be prepared by alkoxylation of phenolic resins. Phenolic resins used in the alkoxylation include the reaction products of phenols with aldehydes and/or ketones. Methods for preparing phenolic resins from phenols with aldehydes and/or ketones are known. For example, U.S. Pat. No. 4,241,201, the teachings of which are incorporated herein by reference, discloses the preparation of phenolic resins from 2,2-bis(4-hydroxyphenyl)propane (bisphenol A) and an aldehyde.

Phenolic resins used in the alkoxylation also include aralkylated phenolic resins. Aralkylated phenolic resins are made, for example, by reacting a phenolic monomer or resin with styrene or a substituted styrene. U.S. Pat. No. 5,889,137, the teachings of which are incorporated herein by reference, discloses the preparation of aralkylated phenolic resins. Aralkylated phenolic resins are more preferred because they give the alkoxylated phenolic resins low viscosity.

Isocyanate-terminated polymers for use in making the urethanes of the invention also contain from about 5 to about 75 wt % of a multifunctional isocyanate. Multi-functional isocyanates useful for making NCO-terminated polymers include aromatic and aliphatic isocyanates. Preferred isocyanates include toluene diisocyanate (TDI), polymeric TDIs, diphenylmethane diisocyanate (MDI), polymeric MDIs, 1,6-hexamethylene diisocyanate (HDI), polymeric HDIs, isophorone diisocyanate (IPDI), polymeric IPDIs, dicyclohexylmethane diisocyanate ($H_{12}$MDI), and the like, and mixtures thereof. The multifunctional isocyanate is used at a molar NCO/OH ratio greater than 1.5/1.0, preferably greater than 2.0/1.0. The NCO-terminated polymers have a free NCO content from about 2.5 to about 25 wt %. Preferably, the polymers have a free NCO content from about 4.0 to about 18 wt %.

Isocyanate-terminated polymers useful for making the urethanes of the invention are preferably prepared by reacting alkoxylated phenolic resins with multifunctional isocyanates. An advantage of using a liquid alkoxylated phenolic resin in the invention is that no solvent is needed in preparing the NCO-terminated polymer. Therefore, ultra-high solids or essentially VOC free coatings can be formulated from these NCO-terminated polymers. Optionally, an organic solvent is used to adjust the viscosity in the reaction. Suitable solvents include ethers, esters, ketones, carbonates, aromatic and aliphatic hydrocarbons, glycol ether esters, lactams, and the like, and mixtures thereof.

The reaction is preferably performed at a temperature within the range of about 25° C. to about 95° C., more preferably from about 50° C. to about 80° C. The reaction is complete when the desired NCO content is achieved. The reaction is usually rapid, but a urethane reaction catalyst can be added to accelerate the reaction. Suitable catalysts include tertiary amines, organozinc and organotin compounds such as stannous octoate, dibutyltin dilaurate, and the like. The amount of catalyst used is usually less than 1% of the NCO-terminated polymer.

The urethane compositions of the invention include less than about 30 wt % of an organic solvent and have viscosities less than about 5,000 cps at 25° C. Thus, the solids content of the coating formulations is greater than about 70 wt %. Suitable solvents include ethers, esters, ketones, carbonates, aromatic and aliphatic hydrocarbons, glycol ether esters, and the like, and mixtures thereof. Ketones, ethers, esters, aromatic hydrocarbons, and mixtures thereof, are preferred.

The urethanes optionally include a crosslinking catalyst, which allows curing to occur quickly. Suitable catalysts include those known in the urethane art for catalyzing the reaction of NCO groups with water. Preferred catalysts are tertiary amine, organozinc, and organotin compounds such as stannous octoate, dibutyltin dilaurate, and the like. The amount of catalyst used depends on many factors, but it is typically present in an amount within the range of about 0.0001 to about 2 wt %.

The urethane compositions of the invention have many applications. They can be used as primers and base-coats to protect metal, wood, and concrete surfaces such as water tanks, pipes, bridges and decks. The coating formulations are applied using techniques that are well known in the art. For example, the formulations can be applied by roller, brush, spray or any other suitable means. The coatings are dried when organic solvents, if any, evaporate at elevated or ambient temperature, and the NCO-terminated polymers are crosslinked by moisture in the air. Alternatively, adding commonly used curatives for isocyanates such as polyamines, glycols, polyols, or hydroxyl or amino resins can be used to cure the urethanes. The urethane compositions of the invention can also be used as sealants, adhesives and elastomers.

A key advantage of the invention is to provide moisture-cure urethane coatings that have ultra-high solids and excellent acid and chemical resistance as demonstrated by the following examples. The examples merely illustrate the invention. Those skilled in the art will recognize many variations that are within the spirit of the invention and scope of the claims.

EXAMPLE 1

Ultra-High Solids Urethane Composition from Liquid Propoxylated Phenolic Resin

Preparation of NCO-Terminated Polymer from Liquid Propoxylated Phenolic Resin

A 250 mL, 4-neck resin kettle equipped with a gas bubbler, a mechanical stirrer, a thermometer, and a condenser is charged with 45.95 grams of liquid phenolic resin Arylflex® DT (product of Lyondell Chemical Company, OH#: 111.5 mg KOH/g), 6.93 grams of poly(oxypropylene) triol ARCOL® LHT-240 (product of Lyondell Chemical Company, OH#: 239 mg KOH/g), 5.29 grams of poly(oxypropylene) triol ARCOL LG-650 (product of Lyondell Chemical Company, OH#: 657 mg KOH/g), 31.83 grams of toluene diisocyanate (TDI), and 10 grams of Aromatic 100 (product of Exxon). The reactor contents are heated at 80° C. with nitrogen flow and agitation until the prepolymer formed has a free NCO content of about 7.61% (about 6 hours). The NCO-terminated polymer has a viscosity of about 9,000 cps at 25° C.

Ultra-high Solids, Moisture-Cure Urethane Coating

An ultra-high solids, moisture-cure coating is formulated by mixing 90 parts of the NCO-terminated polymer, 0.1 part of dibutyltin dilaurate and 0.3 part of BYK-310 (flowing agent, Product of BYK Chemie). The viscosity of the formulation is reduced to 500 cps with Aromatic 100 solvent. About 10 parts of Aromatic 100 is added, giving a solution of about 80 wt % solids. The coating composition is drawn down on polished cold roll steel panels to a uniform wet film of 5 mils thickness with a Bird type film applicator. The panels are dried in a hood at 25° C. for 24 hours and then conditioned at 25° C., 50% humidity for seven days. The panels are tested and give the following results: Gloss at 20°: 110; Gloss at 60°: 116; Konig Hardness: 66; Gardner Impact Direct: 160 lb; Gardner Impact Reverse: 160 lb. The coating shows excellent resistance to glacial acetic acid, hydrochloric acid (37% aqueous solution), nitric acid (10% and 50% aqueous solution), sulfuric acid (50% aqueous solution), ammonium hydroxide (29% aqueous solution), diethylenetriamine, ethylene diamine, methanol, ethanol, methylethyl ketone, benzene, toluene, ethylene dichloride, and styrene.

Comparative Example 2

Moisture-cure Coating Formulated from NCO-Terminated Poly(oxypropylene) Polyols

A moisture-cure urethane coating is formulated from NCO-terminated conventional poly(oxypropylene) polyols according to the procedure of Example 1.

A 250 mL, 4-neck resin kettle equipped with a gas bubbler, a mechanical stirrer, a thermometer, and a condenser is charged with 45.55 grams of poly(oxypropylene) diol ARCOL® R-2587 (product of Lyondell Chemical Company, OH#: 112.5 mg KOH/g), 7.57 grams of poly(oxypropylene) triol ARCOL® LHT-240 (product of Lyondell Chemical Company, OH#: 239 mg KOH/g), 5.05 grams of poly(oxypropylene) triol ARCOL LG-650 (product of Lyondell Chemical Company, OH#: 657 mg KOH/g), 31.83 grams of toluene diisocyanate (TDI), and 10 grams of Aromatic 100. The reactor contents are heated at 80° C. with nitrogen flow and agitation until the prepolymer formed has a free NCO content of about 7.58% (about 6 hours). The NCO-terminated polymer has a viscosity of about 12,000 cps at 25° C.

A moisture-cure coating is prepared following the procedure of Example 1 except that solids content is adjusted to 70 wt % with Aromatic 100 in order to reduce the viscosity sufficiently to be drawn down. The panels are tested and give the following results: Gloss at 20°: 96; Gloss at 60°: 100; Konig Hardness: 21; Gardner Impact Direct: 160 lb; Gardner Impact Reverse: 160 lb. The coating shows poor resistance to nitric acid (50% aqueous solution), sulfuric acid (50% aqueous solution), diethylene triamine, and ethylene diamine.

Comparative Example 3

NCO-Terminated Polymer Made from Conventional Solid Propoxylated Phenolic Resin

The procedure of Example 1 is repeated by using a conventional solid propoxylated phenolic resin.

A 250 mL, 4-neck resin kettle equipped with a gas bubbler, a mechanical stirrer, a thermometer, and a condenser is charged with 36.63 grams of solid propoxylated phenolic resin made according to WO 97/19972 (OH#: 140 mg KOH/g), 21.54 grams of poly(oxypropylene) triol ARCOL® LHT-240 (product of Lyondell Chemical Company, 31.83 grams of toluene diisocyanate (TDI), and 10 grams of Aromatic 100. The reactor contents are heated at 80° C. with nitrogen flow. After about two hours, it is necessary to add another 13 grams of Aromatic 100 (lowering the solids content to 80%) to reduce the viscosity of the reaction mixture sufficiently to allow it to be agitated. The agitation is continued until the prepolymer formed has a free NCO content of about 6.75% (about 4 hours). The resulting NCO-terminated polymer is a semi-solid at 25° C.

Even after diluting this prepolymer to a solids content of 50%, it is still too viscous to be used to prepare a moisture-cure urethane coating.

We claim:

1. A urethane composition that comprises:
    (a) an isocyanate-terminated polymer comprising the reaction product of
        (i) from about 25 to about 95 wt % of a liquid alkoxylated phenolic resin that has an average oxyalkylene chain length within the range of about 3 to about 25; and
        (ii) from about 5 to about 75 wt % of a multifunctional isocyanate;
    wherein the polymer has an NCO content within the range of about 2.5 to about 25 wt %;
    (b) an optional organic solvent; and
    (c) an optional catalyst;
wherein the composition has a solids content greater than about 70 wt % and a viscosity less than about 5,000 cps at 25° C.

2. The composition of claim 1 wherein the alkoxylated phenolic resin is a propoxylated phenolic resin.

3. The composition of claim 1 wherein the alkoxylated phenolic resin is an ethoxylated phenolic resin.

4. The composition of claim 1 wherein the alkoxylated phenolic resin is a butoxylated phenolic resin.

5. The composition of claim 1 wherein the alkoxylated phenolic resin has a mixture of oxyalkylene units selected from oxyethylene, oxypropylene, and oxybutylene.

6. The composition of claim 1 wherein the alkoxylated phenolic resin has an average oxyalkylene chain length within the range of about 5 to about 15.

7. The composition of claim 1 wherein the solids content is greater than about 80 wt %.

8. The composition of claim 1 wherein the solids content is greater than about 90 wt %.

9. A cured coating composition of claim 1.

10. A urethane composition that comprises:
    (a) an isocyanate-terminated polymer comprising the reaction product of
        (i) from about 25 to about 95 wt % of a liquid alkoxylated phenolic resin that has an average oxyalkylene chain length within the range of about 3 to about 25; and
        (ii) from about 5 to about 75 wt % of a multifunctional isocyanate;
    wherein the polymer has NCO content within the range of about 2.5 to about 25 wt %; and
    (b) an optional catalyst
wherein the composition has a solids content greater than about 95 wt % and a viscosity less than about 5,000 cps at 25° C.

* * * * *